(12) United States Patent
Barnes

(10) Patent No.: US 11,760,016 B2
(45) Date of Patent: Sep. 19, 2023

(54) BUILD MATERIAL PARTICLE LAYERING

(71) Applicant: HEWLETT-PACKARD DEVELOPMENT COMPANY, L.P., Houston, TX (US)

(72) Inventor: Arthur H. Barnes, Vancouver, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 1059 days.

(21) Appl. No.: 16/074,319

(22) PCT Filed: Jan. 31, 2017

(86) PCT No.: PCT/US2017/015859
§ 371 (c)(1),
(2) Date: Jul. 31, 2018

(87) PCT Pub. No.: WO2018/075087
PCT Pub. Date: Apr. 26, 2018

(65) Prior Publication Data
US 2021/0187835 A1    Jun. 24, 2021

Related U.S. Application Data

(63) Continuation-in-part of application No. PCT/US2016/057730, filed on Oct. 19, 2016.

(51) Int. Cl.
*B29C 67/00* (2017.01)
*B29C 64/236* (2017.01)
(Continued)

(52) U.S. Cl.
CPC .......... *B29C 64/236* (2017.08); *B29C 64/165* (2017.08); *B29C 64/205* (2017.08);
(Continued)

(58) Field of Classification Search
CPC ........ B22F 10/28; B22F 10/368; B22F 10/37; B29C 64/165; B29C 64/205
See application file for complete search history.

(56) References Cited

U.S. PATENT DOCUMENTS

| 5,387,380 A | * | 2/1995 | Cima | .................... B33Y 30/00 264/109 |
| 6,504,127 B1 | * | 1/2003 | McGregor | ............. B33Y 30/00 219/121.64 |

(Continued)

FOREIGN PATENT DOCUMENTS

| CN | 204036858 U | 12/2014 |
| CN | 205326292 U | 6/2016 |

(Continued)

OTHER PUBLICATIONS

"Electron Beam Additive Manufacturing (EBAM™)", Sciaky, Wirefeed Additive Manufacturing vs. Powder Methods, Retrieved from Internet: http://www.sciaky.com/additive-manufacturing/wire-am-vs-powder-am, Apr. 11, 2016, 8 pages.

(Continued)

*Primary Examiner* — Ryan M Ochylski
(74) *Attorney, Agent, or Firm* — Shook, Hardy & Bacon L.L.P.

(57) ABSTRACT

According to an example, an apparatus may include a recoater, an energy source, a carriage supporting the energy source, and a controller. The controller may control the recoater to spread build material particles into a layer on top of a previously applied layer containing fused build material particles and the carriage to move ahead of the recoater to cause the energy source to apply energy onto build material particles in the previously applied layer prior to the recoater spreading the build material particles onto the previously applied layer. The energy source is to heat the fused build material particles to or maintain the fused build material (Continued)

particles at a temperature above a certain temperature and the recoater is to be controlled to spread the build material particles on top of the previously applied layer prior to the fused build material particles falling below the certain temperature.

6 Claims, 5 Drawing Sheets

(51) Int. Cl.
| | |
|---|---|
| B33Y 10/00 | (2015.01) |
| B33Y 30/00 | (2015.01) |
| B29C 64/165 | (2017.01) |
| B29C 64/264 | (2017.01) |
| B29C 64/205 | (2017.01) |
| B29C 64/227 | (2017.01) |
| B29C 64/386 | (2017.01) |
| B29C 64/209 | (2017.01) |
| B33Y 50/02 | (2015.01) |

(52) U.S. Cl.
CPC .......... *B29C 64/209* (2017.08); *B29C 64/227* (2017.08); *B29C 64/264* (2017.08); *B29C 64/386* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 7,008,209 B2 | 3/2006 | Iskra et al. | |
| 7,389,154 B2 | 6/2008 | Hunter et al. | |
| 2002/0105114 A1* | 8/2002 | Kubo | B29C 64/165 |
| | | | 264/497 |
| 2006/0081571 A1* | 4/2006 | Hoebel | B22F 10/25 |
| | | | 219/121.64 |
| 2006/0099287 A1 | 5/2006 | Kim et al. | |
| 2006/0266740 A1* | 11/2006 | Sato | B23K 26/144 |
| | | | 219/121.84 |
| 2008/0211132 A1 | 9/2008 | Feenstra | |
| 2010/0247742 A1* | 9/2010 | Shi | B33Y 40/00 |
| | | | 427/8 |
| 2011/0031496 A1* | 2/2011 | Yamazaki | H01L 27/3262 |
| | | | 257/59 |
| 2011/0059247 A1* | 3/2011 | Kuzusako | B29C 64/165 |
| | | | 427/372.2 |
| 2015/0165524 A1 | 6/2015 | Ljungblad et al. | |
| 2015/0174658 A1 | 6/2015 | Ljungblad | |
| 2015/0246483 A1* | 9/2015 | Goto | B33Y 30/00 |
| | | | 428/206 |
| 2015/0258706 A1 | 9/2015 | Okamoto et al. | |
| 2015/0306667 A1 | 10/2015 | Yao | |
| 2015/0321255 A1 | 11/2015 | Colin et al. | |
| 2016/0114529 A1 | 4/2016 | Nakamura | |
| 2016/0151973 A1 | 6/2016 | Juan Jover et al. | |
| 2016/0243619 A1* | 8/2016 | Gothait | B29C 64/112 |
| 2016/0263829 A1 | 9/2016 | Okamoto et al. | |
| 2016/0297143 A1* | 10/2016 | Ganapathiappan | A01N 43/80 |
| 2016/0318251 A1* | 11/2016 | Ederer | B29C 64/165 |
| 2017/0151722 A1* | 6/2017 | Prasad | B29C 67/00 |
| 2017/0203513 A1* | 7/2017 | Chanclon | B33Y 40/00 |
| 2017/0232677 A1* | 8/2017 | Emamjomeh | B33Y 30/00 |
| | | | 264/494 |
| 2017/0282456 A1* | 10/2017 | Wright | B29C 70/882 |
| 2017/0355137 A1 | 12/2017 | Ederer et al. | |
| 2017/0368748 A1* | 12/2017 | De Pena | B33Y 30/00 |

FOREIGN PATENT DOCUMENTS

| | | | | |
|---|---|---|---|---|
| EP | 2572864 A1 | * | 3/2013 | .......... B29C 64/236 |
| JP | 2007270227 A | | 10/2007 | |
| JP | 2016-168704 A | | 9/2016 | |
| WO | WO-2007114895 A2 | * | 10/2007 | .......... B29C 64/165 |
| WO | 2009/145069 A1 | | 12/2009 | |
| WO | WO-2015055361 A1 | | 4/2015 | |
| WO | 2015/106838 A1 | | 7/2015 | |
| WO | 2015167520 A1 | | 11/2015 | |
| WO | 2016053312 A1 | | 4/2016 | |
| WO | 2016080993 A1 | | 5/2016 | |
| WO | WO-2016083234 A1 | | 6/2016 | |
| WO | WO-2016119898 A1 | | 8/2016 | |

OTHER PUBLICATIONS

Hipolite, W., "3D-Proto Creates Unique Dual 'Parking' Extruder System for 3D Printers," retrieved at https://3dprint.com/26590/dual-parking-extruder/, retrieved on Mar. 30, 2022, 6 Pages.

* cited by examiner

BUILD MATERIAL PARTICLE LAYERING

BACKGROUND

Some 3D manufacturing apparatuses employ additive manufacturing techniques to build or print parts within a 3D build envelope of the 3D manufacturing apparatus. Some additive manufacturing techniques employ a layering process in which particles of build material are spread into a layer and selectively fused together. Following that process, additional particles are spread into another layer and selectively fused together. This process may be repeated for a number of times to build up a 3D part.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are methods and apparatuses for forming layers of build material particles having strong interlaminar bond strength by re-melting fused build material particles in a prior layer or by maintaining fused build material particles in the prior layer above a certain temperature prior to applying additional build material particles in a next layer. The apparatuses disclosed herein may include a movable recoater and a movable energy source. According to an example, while the energy source is moved, e.g., scanned across the prior layer, the energy source may be implemented to heat fused build material particles along strips affected by the energy source (or to maintain the previously fused build material particles in the strips above a melting temperature of the build material particles). In addition, prior to the fused build material particles falling below the certain temperature, e.g., while the fused build material particles are in a melted state, the recoater may be controlled to apply additional build material particles on the layer to form a next layer.

In one regard, when the fused build material particles are above the certain temperature, e.g., when in a melted stated, the fused build material particles may be relatively soft, viscous, and gummy. While in a gummy state, the fused build material particles may improve contact and adhesion with the additional build material particles in the next layer of build material particles. As such, the gummy interface between the layers of build material particles may enhance the interlaminar bond strength between the build material particles in the layers when the previously fused build material particles cool and solidify. The enhanced interlaminar bond strength may also result in enhanced material properties of 3D parts formed through implementation of the methods and apparatuses disclosed herein.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1A:
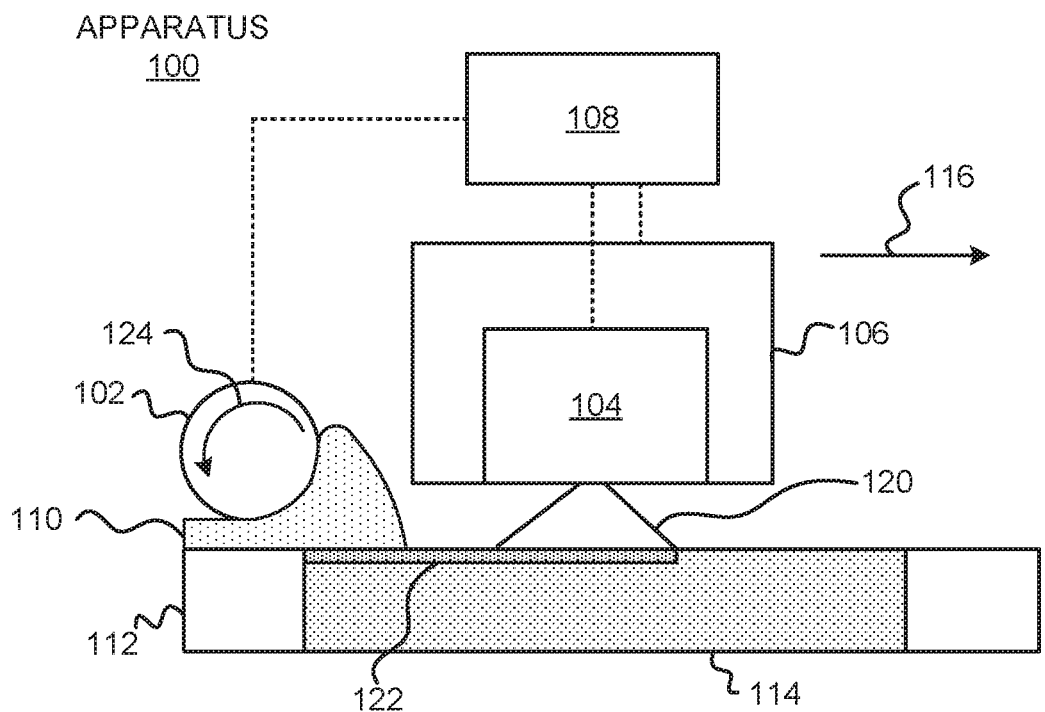
FIGS. 1A and 1B, respectively, show simplified front views of an example apparatus for generating, building, or printing three-dimensional parts.

With reference first to FIG. 1A, there is shown a simplified front view of an example apparatus 100 for generating, building, or printing three-dimensional parts. It should be understood that the apparatus 100 depicted in FIG. 1A may include additional components and that some of the components described herein may be removed and/or modified without departing from a scope of the apparatus 100 disclosed herein.

The apparatus 100, which may be a three-dimensional (3D) printer, may include a recoater 102, an energy source 104 (which is also referred to herein as a heating device), a carriage 106, and a controller 108. Although a single energy source 104 has been depicted, it should be understood that the apparatus 100 may include any suitable number of energy sources 104 to sufficiently heat the build material particles 110, and particularly, fused build material particles, as discussed herein. As denoted by the dashed lines, the controller 108 may control operations of the recoater 102, the energy source 104, and the carriage 106 during 3D part printing operations. In one regard, the controller 108 may be a computing device, a semiconductor-based microprocessor, a central processing unit (CPU), an application specific integrated circuit (ASIC), and/or other type of hardware computing device. In addition, the controller 108 may control the recoater 102, the energy source 104, and the carriage 106 through wired or wireless communication.

As shown, the controller 108 may control the recoater 102 to spread build material particles 110 in a layer. The recoater 102 is depicted in FIG. 1A as spreading build material particles 110 on top of a plurality of previously applied layers 112. Also depicted in FIG. 1A is a portion 114 of a 3D part being formed in the layers 112 of build material particles 110. As discussed in greater detail herein below, the portions 114 of the 3D part may be formed in individual layers 112 through application of a fusing agent onto certain areas of the layers 112 at which the portions 114 are to be formed and through application of energy, such as heat, onto the layers 112, which may cause the build material particles 110 upon which the fusing agent has been deposited to melt and subsequently fuse together when being cooled and solidifying. In other examples, the portions 114 of the 3D part may be formed in individual layers 112 through application of energy, such as a laser beam, onto build material particles 110 located in certain areas of the layers 112 to cause those build material particles 110 to melt and subsequently fuse together when being cooled and solidifying.

The recoater 102 may be moved in a direction denoted by the arrow 116 to spread the build material particles 110 as a layer having a substantially uniform thickness over the previously formed layers 112. In an example, the controller 108 may activate the energy source 104 such that the energy source 104 applies energy 120 onto at topmost previously applied layer 112. In other examples, the energy source 104 may be maintained in an active state regardless of whether the energy source 104 is applying energy onto the topmost previously applied layer 112. The energy source 104 may be a heating lamp, multiple heating lamps, a laser beam source, or the like and the energy 120 may be in the form of radiation, light, heat, or the like. In addition, the energy 120 may be of sufficient strength to cause the build material particles 110 that have previously been fused together to re-melt (or be maintained above a melting temperature of the build material particles 110) without causing the build material particles 110 that have not been previously fused together from melting, while the energy source 104 is being moved or scanned 116 at a particular speed. That is, for instance, the energy source 104 may output energy at a level that causes the build material particles 110 in the portions 114, i.e., the build material particles 110 that have previously been melted and fused together, to be heated to above a certain temperature, e.g. and melting temperature, while the build material particles 110 outside of the portions 114, i.e., the build material particles 110 that have not previously been melted and fused together remain below the certain temperature.

In examples in which fusing agent is employed to selectively fuse the build material particles 110, the energy source 104 may be a heating lamp. In these examples, the selective heating of the previously fused build material particles may occur because the fusing agent may increase absorption of the energy 120 in the build material particles 110 upon which the fusing agent has been deposited, which may result in those build material particles 110 to melt without causing the build material particles 110 upon which the fusing agent has not been deposited to melt. In other examples, for instance, in which the energy source 104 is a laser beam source, the energy 120 may selectively be applied onto the previously fused build material particles 110 while avoiding the build material particles 110 that were not previously fused.

The controller 108 may control the carriage 106 to move in the direction 116 ahead of the recoater 102 such that the recoater 102 applies additional build material particles 110 while the build material particles 110 in the certain area 114 are in a melted or gummy state. According to examples, the carriage 106 may move at the same velocity as the recoater 102 in the direction 116. In other examples, the carriage 106 may move at a different velocity than the recoater 102. In any regard, the energy source 104 may cause the build material particles 110 that were fused together in a previously applied layer 112 to be heated to a certain temperature, e.g., at least a melting temperature of the build material particle 110, before additional build material particles 110 are applied on the previously applied layer 112. The build material particles 110 that were fused together in the previously applied layer 112 are denoted with reference numeral 122 in FIG. 1A.

The time between when the energy source 104 heats the previously fused build material particles 122 (or maintains the previously fused build material particles 122 above the certain temperature) and the recoater 102 spreads additional build material particles 110 onto the previous layer 112 may be based upon the amount of time that the previously fused build material particles 122 remain above the certain temperature following removal of the energy 120 from the fused build material particles 122. That is, for instance, the time may be set such that the recoater 102 spreads additional build material particles 110 onto the previous layer 112 prior to the previously fused build material particles 122 being sufficiently cooled to harden. According to examples, the time may be set based upon testing of various types of build material particles, various energy levels of the energy source 104, various speeds at which the energy source 104 is moved, etc. In addition, various other characteristics of the apparatus 100 may be set based upon testing, such as the distance between the recoater 102 and the energy source 104, the power level at which the energy source 104 is set, the speed or speeds at which the carriage 106 and the recoater 102 move, etc.

In one regard, when maintained at a temperature above the certain temperature, the previously fused build material particles 110 may be relatively soft, viscous, and gummy, which may improve contact and adhesion with the additional build material particles in the currently applied layer of build material particles 110. As such, the gummy interface with the additional build material particles 110 may enhance the interlaminar bond strength between the build material particles 110 in a previously applied layer 112 and the additional build material particles 110 in the newly applied layer when the melted previously fused build material particles 110 solidify again. The enhanced interlaminar bond strength may also result in enhanced material properties of the 3D part.

According to an example, in addition to moving in the direction 116 during a build material particle 110 spreading operation, the recoater 102 may rotate as indicated by the arrow 124. Rotation of the recoater 102 in the direction indicated by the arrow 124, e.g., counterclockwise when the build material particles 110 are spread in a left-to-right direction, may result in a relatively more even spreading of the build material particles 110. In other examples, the recoater 102 may not rotate and/or may have a different configuration than as depicted in FIG. 1A. For instance, the recoater 102 may be a blade, a doctor blade, a rake, or the like.

Figure 1B:
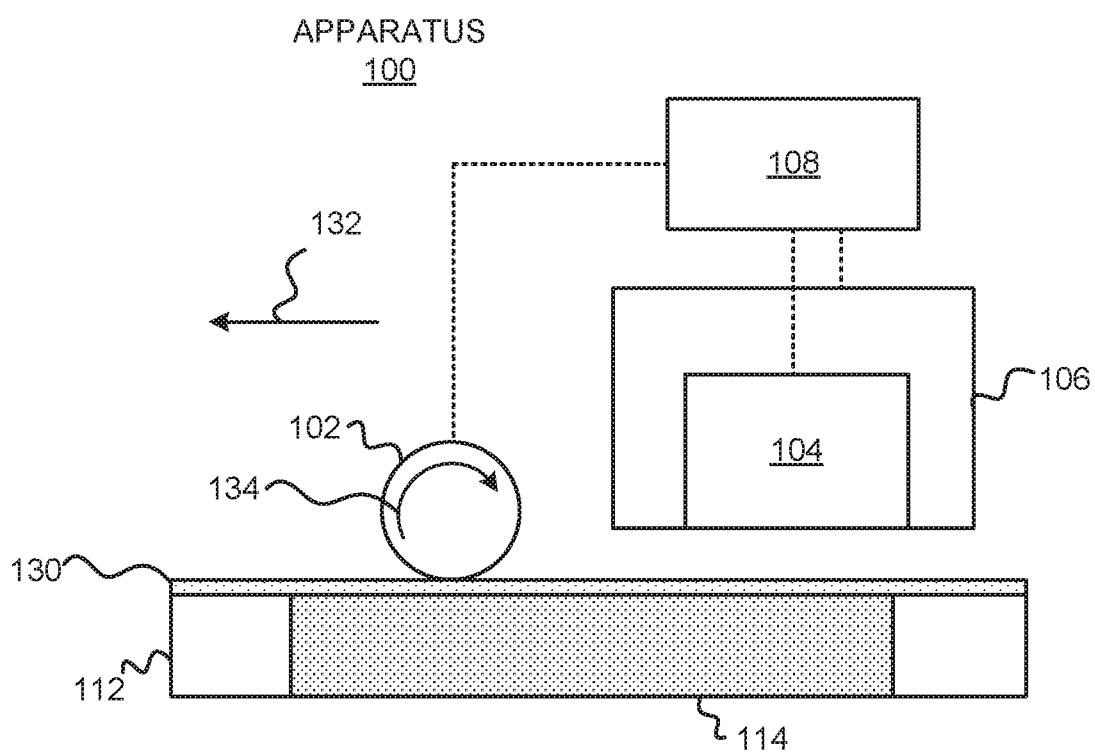

The recoater 102 may be movable in a direction away from the applied layers 112 of build material particles 110, e.g., in a vertical direction. The recoater 102 may be moved away, e.g., raised, from the applied layers 112 of build material particles 110 prior to a return movement of the recoater 102 and the carriage 106. In addition, as shown in FIG. 1B, the recoater 102 may be moved toward, e.g., lowered, and placed in contact with the new layer 130. That is, following the spreading of the build material particles 110 into a new layer 130, the recoater 102 may be raised away from the new layer 130 and moved back toward the other side of the new layer 130 as denoted by the arrow 132 as shown FIG. 1B. Particularly, once the recoater 102 has cleared a portion of the new layer 130, the recoater 102 may be placed into contact with the new layer 130 and may rotate in the direction indicated by the arrow 134, e.g., clockwise when the recoater 102 is being moved in a right-to-left direction.

As discussed in greater detail below, a fusing agent may be deposited onto the build material particles 110 positioned at selected areas of the new layer 130 to continue to form a 3D part. In other examples, other types of agents may be deposited that prevent fusing of the build material particles 110 upon which the agents have been deposited. In these examples, the agent he may be deposited onto the build material particles 110 that are located in areas that are not to be fused together. In still other examples, a melting device may be moved over the build material particles 110 to selectively apply fusing radiation, e.g., in the form of a laser beam, to continue to form a 3D part. In any regard, the recoater 102 may be lowered and additional build material particles 110 may be provided for the recoater 102 to spread on top of the new layer 130 and the process discussed above with respect to FIGS. 1A and 1B may be repeated for the next layer. The processes depicted in FIGS. 1A and 1B may be repeated until the 3D part is completed.

Figure 2:
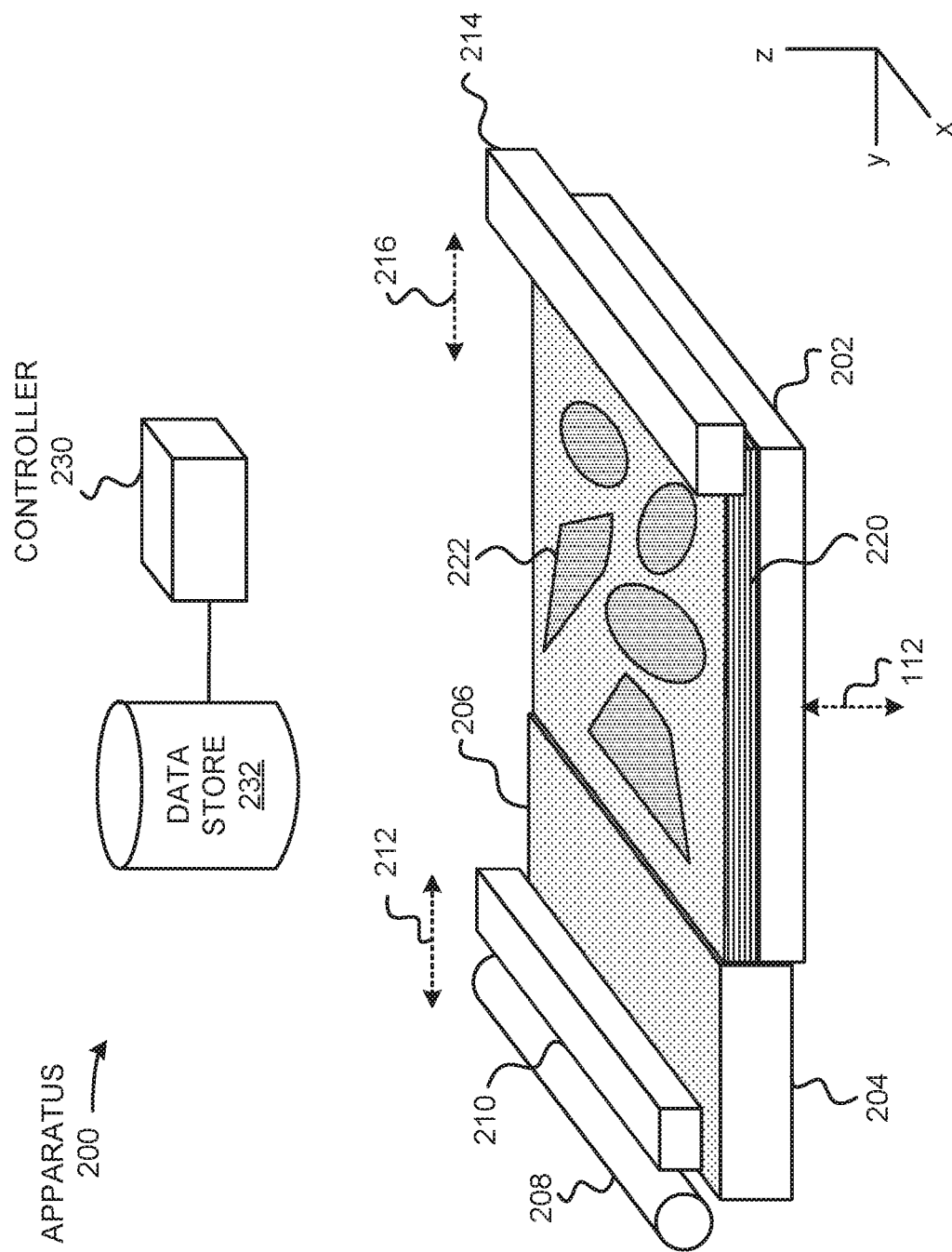
FIG. 2 shows a simplified isometric view of an example apparatus, e.g., a 3D printer.

With reference now to FIG. 2, there is shown a simplified isometric view of an example apparatus 200, e.g., a three-dimensional (3D) printer, for generating, building, or printing three-dimensional parts. It should be understood that the apparatus 200 depicted in FIG. 2 may include additional components and that some of the components described herein may be removed and/or modified without departing from a scope of the apparatus 200 disclosed herein.

The apparatus 200 may include a build area platform 202, a build material supply 204 containing build material particles 206, and a recoater 208. The build material supply 204 may be a container or surface that is used to position build material particles 206 between the recoater 208 and the build area platform 202. The build material supply 204 may be a hopper or a surface upon which the build material particles 206 may be supplied, for instance, from a build material source (not shown) located above or adjacent to the build material supply 204. Additionally, or alternatively, the build material supply 204 may include a mechanism to provide, e.g., move, the build material particles 206 from a storage location to a position to be spread onto the build area platform 202 or a previously formed layer of build material particles 206. For instance, the build material supply 204 may include a hopper, an auger conveyer, a plowing mechanism, or the like. Generally speaking, 3D objects or parts may be generated from the build material particles 206.

The build material particles 206 may be particles, e.g., in the form of a powder, fibers, or the like, and may be formed of materials such as polymers, plastics, metals, ceramics, or combinations thereof. The build material particles 206 may be formed to have widths that are formed according to a specified average dimension. By way of particular example, the build material particles 206 may be formed to have dimensions, e.g., widths, heights, diameters, and/or lengths, that are on average, around 50 microns. In other examples, the build material particles 206 may be formed to have other average dimensions, such as around 40 microns, 60 microns, or the like.

The apparatus 200 may also include an energy source 210, which may be similar to the energy source 104 depicted in FIG. 1A and discussed above with respect to that figure. Likewise, the recoater 208 may be similar to the recoater 102 depicted in FIG. 1A and discussed above with respect to that figure. In addition, the recoater 208 and the energy source 210 may move in the directions denoted by the arrow 212 as discussed with respect to FIGS. 1A and 1B, e.g., along the y-axis. The recoater 208 may further move vertically, e.g., along the z-axis, to be positioned between build material particle 206 spreading and non-spreading positions. As discussed herein, the energy source 210 may be implemented to heat build material particles 206 in certain areas of a layer 220 during a printing pass and to re-melt the previously melted build material particles 206 (or maintain the previously melted build material particles 206 above the melting temperature of the build material particles 206) during an additional layer formation pass. In other examples, the apparatus 200 may include a separate melting device to melt and fuse the build material particles 206 and form sections of 3D parts. In these examples, the energy source 210 may be implemented to heat previously fused bu The apparatus 200 may further include an agent delivery device 214 that may move in directions denoted by the arrow 216, e.g., along the y-axis. In some examples, the agent delivery device 214 may move separately from the energy source 210, while in other examples, the agent delivery device 214 may be supported on a common carriage as the energy source 210 and may thus move concurrently with the energy source 210. In addition or in other examples, the agent delivery device 214 may move in different directions than as shown in FIG. 2. For instance, the agent delivery device 214 may move in a direction that is perpendicular to the arrow 216, e.g., along the x-axis. In any regard, the agent delivery device 214 may include a plurality of orifices through which an agent may selectively be expelled for delivery onto a topmost layer 220 of build material particles 206. The agent may be a liquid that is to absorb fusing radiation (e.g., in the form of light and/or heat) to cause the build material particles 206 upon which the agent has been deposited to fuse together when the fusing radiation is applied.

In addition or in other examples, the agent delivery device 214 may selectively deliver a detailing agent onto the layer 220 of build material particles 206. The detailing agent may be a liquid that may absorb significantly less of the fusing radiation as compared with the fusing agent. In one example, the detailing agent may prevent or significantly reduce the fusing together of the build material particles 206 upon which the detailing agent has been deposited. In other examples, the detailing agent may be implemented to provide coloring to exterior portions of the build material particles 206 that have been fused together. Various additives and/or catalysts that either enhance or reduce radiation absorption may be included in the agent or agents delivered onto the layer 220 of build material particles 206. For instance, the agent or agents may include a radiation absorbing agent, i.e., an active material, metal nanoparticles, or the like. The agent or agents may additionally or alternatively include any of a co-solvent, a surfactant, a biocide, an anti-kogation agent, a dispersant, and/or combinations thereof.

FIG. 2 depicts a plurality of layers 220 of build material particles 206 that have previously been formed on the build area platform 202. The layers 220 may each be formed to a substantially uniform thickness across the build area platform 202. In an example, the thicknesses of the layers 220 may range from about 90 µm to about 110 µm, although thinner or thicker layers may also be used. For example, the thicknesses of the layer 220 may range from about 20 µm to about 200 µm, or from about 50 µm to about 200 µm.

The agent delivery device 214 may be controlled to selectively deliver droplets of an agent onto the build material particles 206 in a topmost layer 220. The agent may be delivered onto certain, e.g., preselected, areas of the layer 220, for instance, areas 222 containing build material particles 206 that are to be fused together (or that are not to be fused together) to form a part of a 3D object. The apparatus 200 may also include an additional agent delivery device (not shown) that may be controlled to selectively deliver droplets of the agent or another type of agent. In any regard, the agent delivery device(s) 214 may be a thermal inkjet printhead, a piezoelectric printhead, or the like, and may extend a width of the build area platform 202.

In other examples in which the agent delivery device(s) 214 does not extend the width of the build area platform 202, the agent delivery device(s) 214 may be scanned along the x-axis to thus enable the agent delivery device(s) 214 to be positioned over a majority of the area above the build area platform 202. The agent delivery device(s) 214 may thus be attached to a moving XY stage or a translational carriage (neither of which is shown) that is to move the agent delivery device(s) 214 adjacent to the build area platform 202 in order to deposit the agent(s) in certain areas of the layer 220 of the build material particles 206.

Following deposition of the agent(s) onto certain areas of the layer 220, the energy source 210 may be implemented to apply fusing radiation onto the build material particles 206 in the layer 220. Particularly, the energy source 210 may be activated and moved across the layer 220, for instance, along the direction indicated by the arrow 212 to apply fusing radiation in the form of light and/or heat onto the build material particles 206. Examples of the energy source 210 may include UV, IR or near-IR curing lamps, IR or near-IR light emitting diodes (LED), halogen lamps emitting in the visible and near-IR range, lasers with desirable electromagnetic wavelengths, or the like. The type of energy source 210 may depend, at least in part, on the type of active material used in the agent(s).

Application of fusing radiation onto the build material particles 206 may cause the build material particles 206 upon which the fusing agent has been applied (or upon which detailing agent has not been deposited) to melt and subsequently fuse together following removal of the application of fusing radiation, i.e., during cooling. As such, portions 220 of a 3D part or 3D parts may be selectively formed through selective application of the agent and subsequent application of fusing energy.

As further shown in FIG. 2, the apparatus 200 may include a controller 230 that may control operations of the build area platform 202, the build material particle bin 204, the recoater 208, the energy source 210, and the agent delivery device 214. Particularly, for instance, the controller 230 may control actuators (not shown) to control various operations of the apparatus 200 components. The controller 230 may be similar to the controller 108 depicted in FIG. 1A and may be connected to the apparatus 200 components via communication lines (not shown).

The controller 230 may also be in communication with a data store 232. The data store 232 may be volatile and/or non-volatile memory, such as DRAM, EEPROM, MRAM, phase change RAM (PCRAM), memristor, flash memory, and the like. The data store 232 may include data pertaining to a 3D object to be printed by the apparatus 200. For instance, the data may include the locations in each build material layer 220 that the agent delivery device 214 is to deposit an agent to form the 3D object. The controller 230 may use the data to control the locations on each of the build material layers 220 that the agent delivery device 214 deposits droplets of the agent.

According to other examples, instead of or in addition to the agent delivery device 214, the apparatus 200 may include a melting device, such as a laser beam source, a laser sintering machine, etc. In these examples, the melting device may direct a laser beam to the build material particles 206 located in certain areas 222 to melt those build material particles 206 such that those build material particles 206 to fuse together when cooled. The controller 230 may control the melting device in these examples.

Although not shown, the apparatus 200 may also include warming devices arranged in an array above the build area platform 202. Each of the warming devices may be a lamp or other heat source that is used to apply heat onto spread layers of the build material particles 206, for instance, to maintain the build material particles 206 at or above a predetermined threshold temperature. According to an example, the warming devices may maintain the temperatures of the build material particles 206 at a relatively high temperature that facilitates the selective fusing of the build material particles 206 at certain areas 222. In addition, or in other examples, the print bed 202 may include heating devices, e.g., resistors.

Figure 3:
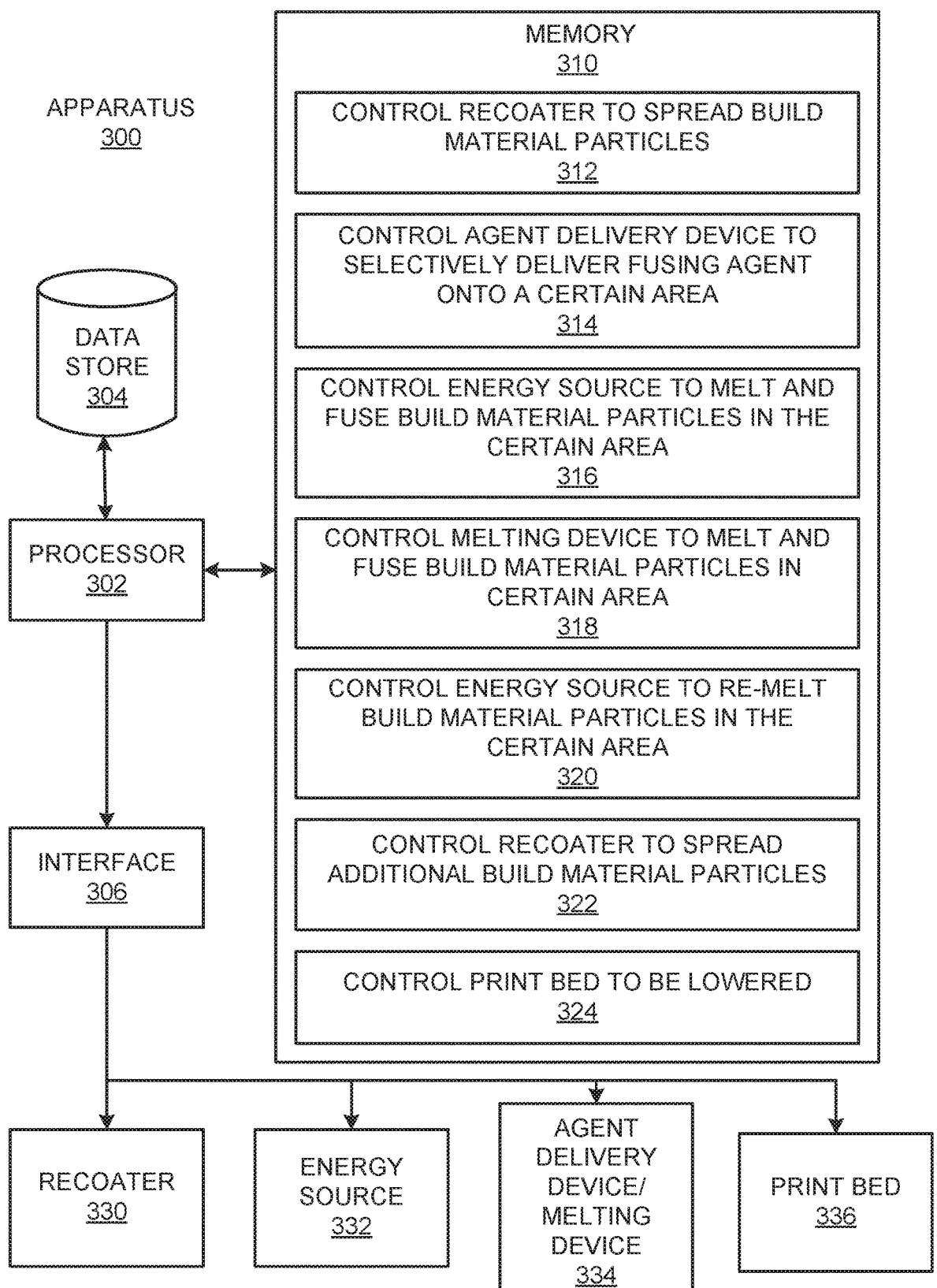
FIG. 3 shows a simplified block diagram of another example apparatus.

Turning now to FIG. 3, there is shown a simplified block diagram of another example apparatus 300. The apparatus 300 may be equivalent to either of the apparatuses 100, 200 depicted in FIGS. 1A and 2 and may include a processor 302, a data store 304, and a memory 310. The processor 302 may be equivalent to the controllers 108, 230 and the data store 304 may be equivalent to the data store 232 and thus detailed descriptions of the processor 302 and the data store 232 are not provided herein.

The apparatus 300 may further include an input/output interface 306, which may include hardware and/or software to enable the processor 302 to communicate with external devices, such as a recoater 330, an energy source 332, an agent delivery device/melting device 334, a print bed 336, etc. The input/output interface 306 may enable a wired or wireless connection to the external devices 330-336. The external devices 330-336 may respectively be equivalent to the recoaters 102, 208, the energy sources 104, 210, the agent delivery device 214/melting device, and the print bed 202 depicted in FIGS. 1A and 2. The input/output interface 306 may further include a network interface card and/or may also include hardware and/or software to enable the processor 302 to communicate with various input and/or output devices, such as a keyboard, a mouse, a display, another computing device, etc., through which a user may input instructions into the apparatus 300. In other examples, the apparatus 300 may be a computing device, a server computer, a laptop computer, or the like. In these examples, the apparatus 300 may not include the external devices 330-336, but may instead communicate instructions to the external devices 330-336.

The memory 310 may have stored thereon machine readable instructions 312-322 (which may also be termed computer readable instructions) that the processor 302 may execute. The memory 310, which may also be referred to as a computer readable storage medium, may be a non-transitory machine-readable storage medium, where the term "non-transitory" does not encompass transitory propagating signals. The memory 310 may be volatile and/or non-volatile memory, such as DRAM, EEPROM, MRAM, phase change RAM (PCRAM), memristor, flash memory, and the like.

With reference to FIGS. 2 and 3, the processor 302 may fetch, decode, and execute the instructions 312 to control the recoater 330 to spread build material particles 206 into a layer 220 over a print bed 202. Thus, for instance, the processor 302 may control the recoater 330 to spread build material particles 206 from a bin 204 onto the print bed 336 or a previously formed layer 220. In some examples, the processor 302 may fetch, decode, and execute the instructions 314 to control the agent delivery device 334 to selectively deliver an agent onto a certain area of the spread layer of build material particles 206. For instance, the processor 302 may control the agent delivery device 334 to deliver an agent onto the areas 222. In these examples, the processor 302 may also fetch, decode, and execute the instructions 316 to control the energy source 332 or a melting device 334 to apply fusing radiation onto the layer of build material particles 206 to melt and fuse the build material particles 206 upon which the fusing agent has been deposited.

In other examples, instead of executing the instructions 314, the processor 302 may fetch, decode, and execute the instructions 316 to control the melting device 334 to melt build material particles 206 in certain areas 222 such that those build material particles 206 become fused together when those build material particles 206 are cooled. The memory 310 may have stored thereon instructions 314, 316, or both.

In any of the examples above, the processor 302 may fetch, decode, and execute the instructions 318 to control the energy source 332 to apply energy onto the layer of build material particles 206 to heat the build material particles 206 in the certain area 222 (or to maintain the build material particles in the certain area 222 above a melting temperature of the fused build material particles 206). The processor 302 may execute the instructions 318 after a predetermined period of time has elapsed, after the energy source 332 has returned to a particular position with respect to the recoater 330, or the like. In any regard, while the energy source 332 is applying energy onto the layer of build material particles 206, the processor 302 may fetch, decode, and execute the instructions 320 to control the recoater 330 to spread additional build material particles 206 onto the previous layer such that the additional build material particles 206 are provided on the previously fused build material particles 206 while those build material particles 206 are above a certain temperature, e.g., at least melting temperature of the fused build material particles 206.

The processor 302 may fetch, decode, and execute the instructions 322 to control the print bed 336 to be lowered. For instance, the processor 302 may cause the print bed 336 to be lowered following the formation of each new layer or the formation of a preset number of new layers.

Figure 4:
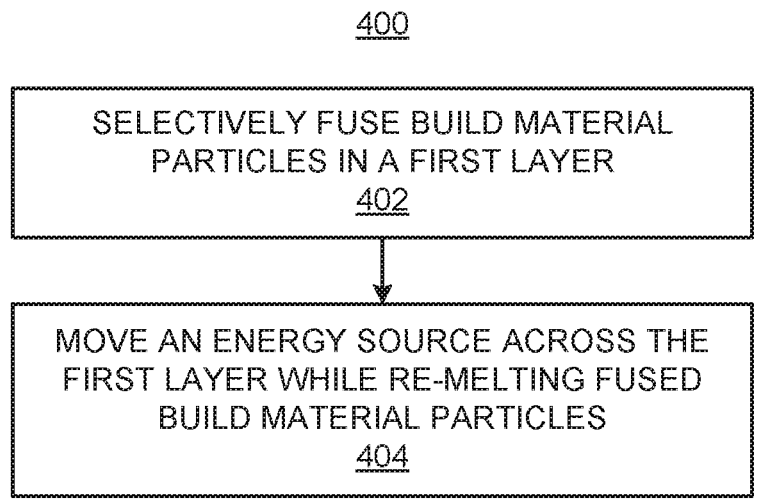
FIGS. 4-6, respectively, show flow diagrams of example methods for forming layers of build material particles having strong interlaminar bond strength.
Figure 5:
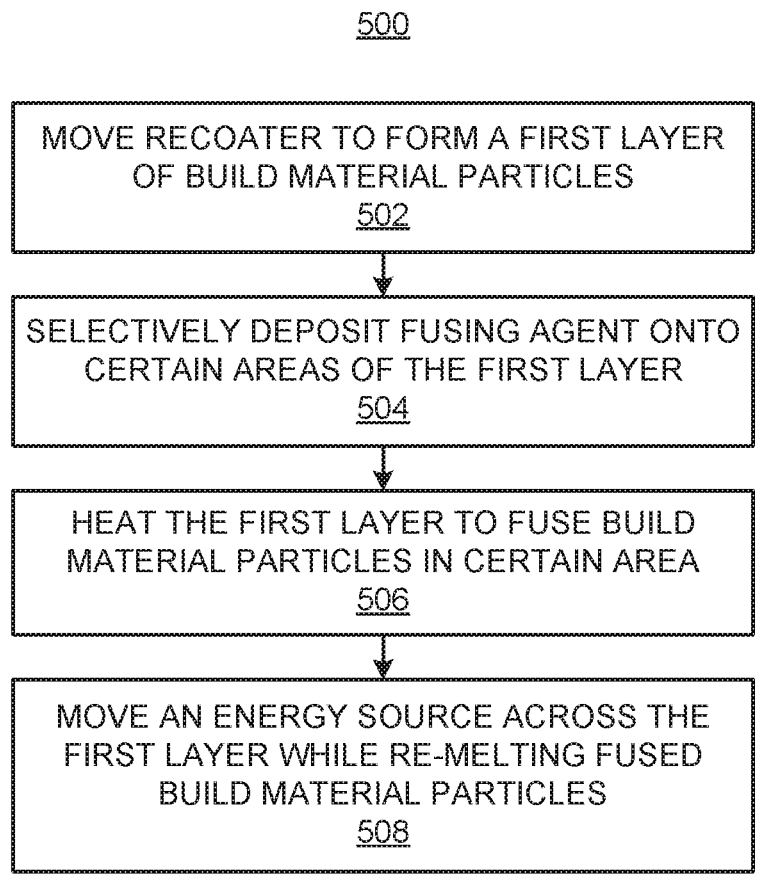
Figure 6:
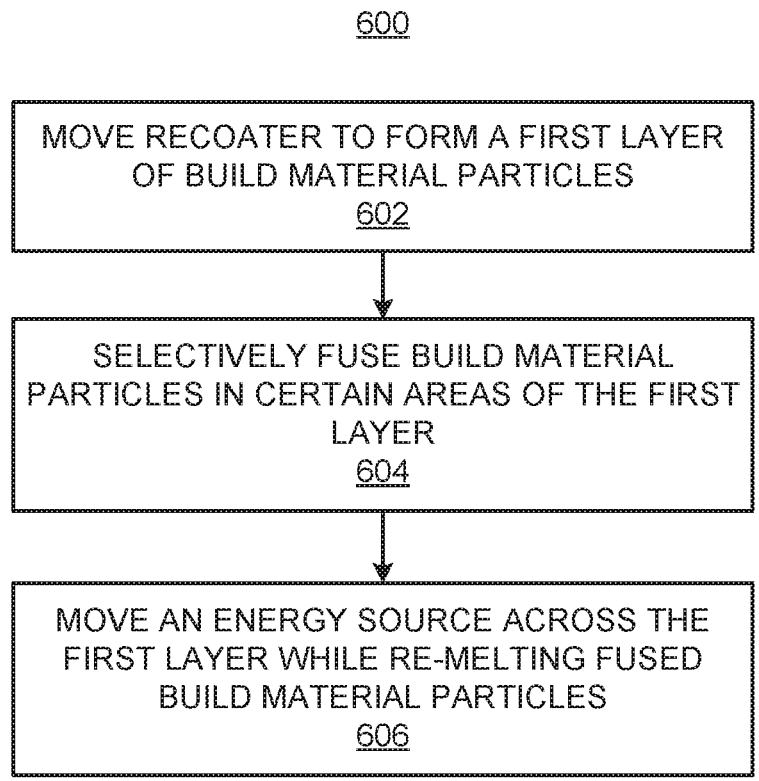

Various manners in which the apparatus 300 may be implemented are discussed in greater detail with respect to the methods 400-600 respectively depicted in FIGS. 4-6. Particularly, FIGS. 4-6 respectively depict example methods 400, 500, 600 for forming layers of build material particles having strong interlaminar bond strength. It should be understood that the methods 400, 500, 600 respectively depicted in FIGS. 4-6 may include additional operations and that some of the operations described therein may be removed and/or modified without departing from the scopes of the methods 400, 500, 600. The descriptions of the methods 400, 500, 600 are made with reference to the features depicted in FIGS. 2 and 3 for purposes of illustration and thus, it should be understood that the methods 400-600 may be implemented in apparatuses 200, 300 having architectures different from those shown in FIGS. 2 and 3.

Generally speaking, the processor 302 of the apparatus 300 may implement or execute some or all of the instructions 312-322 stored on the memory 310 to perform the methods 400, 500, 600. Prior to or as part of the execution of any of the methods 400, 500, 600, the processor 302 may identify a part or a plurality of parts to be fabricated. For instance, the processor 302 may access information, such as computer aided design information of the part or parts, which may be stored in the data store 304. The computer aided design information may identify the physical characteristics of the parts, for instance, the shapes and dimensions of the parts, which the processor 302 may use in determining where to selectively deposit fusing agent.

With reference first to FIG. 4, at block 402, the processor 302 may execute the instructions 314 and 316 to selectively fuse build material particles 206 in a certain area 222 of a first layer of build material particles 220. In other examples, the processor 302 may execute the instructions 316 to selectively fuse build material particles 206 in a certain area 222 of a first layer of build material particles 220 without first executing the instructions 314, e.g., in examples in which a fusing agent is not used to fuse the build material particles 220. These examples are discussed in greater detail below with respect to FIGS. 5 and 6.

At block 404, the processor 302 may execute the instructions 318 to scan an energy source 332 across the first layer 220 of build material particles 206 while the energy source 332 raises or maintains the fused build material particles 222 in locations that receive energy from the energy source 332 above a certain temperature. For instance, the processor 302 may cause the energy source 332 to scan across the first layer 220 of build material particles 206 to re-melt at least some of the fused build material particles in the certain area 222 (or to maintain at least some of the fused build material particles in the certain area 222 above a melting temperature of the fused build material particles). The amount of energy, e.g., the temperature, at which the energy source 332 supplies energy may be sufficient to melt the previously fused build material particles (or maintain the previously fused build material particles above the melting temperature) without melting the un-fused build material particles as discussed above. In addition, while the previously fused build material particles in the certain area 222 are above the certain temperature, the processor 302 may execute the instructions 320 to move the recoater 330 to spread additional build material particles onto the first layer 220 of build material particles 206 and form a second layer of build material particles 206 on top of the first 220 layer of build material particles 206. That is, for instance, the recoater 330 may be moved behind the energy source 334 such that the additional build material particles 206 are spread onto the first layer 220 while the fused build material materials 206 are in above the certain temperature, e.g., in a melted state. By way of example, the recoater 330 may move concurrently with the energy source 334, may be supported on the same carriage, etc.

Turning now to FIG. 5, at block 502, the processor 302 may execute the instructions 312 to move a recoater 330 to form a first layer 220 of build material particles 206. The recoater 330 may be implemented to form the first layer 220 of build material particles 206 as discussed above with respect to FIGS. 1A and 2.

At block 504, the processor 302 may execute the instructions 314 to selectively deposit a fusing agent onto certain areas 222 of the first layer 220. In addition, at block 506, the processor 302 may execute the instructions 316 to apply heat onto the first layer 220 of build material particles 206 in the certain areas 222, i.e. the build material particles 206 on which the fusing agent was selectively deposited. For instance, the processor 302 may cause the energy source 332 to be moved across the first layer 220 to heat the build material particles 206 with sufficient energy to cause the build material particles 206 upon which the fusing agent was selectively deposited to melt without causing the build material particles 206 upon which the fusing agent was not deposited to melt. As the energy source 332 is moved away from the melted belt material particles 206 and application of energy is ceased, the melted build material particles 206 may begin to cool and fuse together.

At block 508, the processor 302 may execute the instructions 318 to scan the energy source 332 across the first layer 220 of build material particles 206 while the energy source 332 raises or maintains the fused build material particles 206 in locations 222 of the first layer 220 that receive energy from the energy source 332 above a certain temperature. That is, the energy source 332 may apply energy, e.g., temperature, radiation, light, etc., onto strips of the first layer 220 of build material particles 206 as the energy source 332 is scanned, e.g., progressively along strips of the first layer 220. The energy source 332 may broadly apply energy across the strips or may apply energy selectively across the strips as discussed herein. The certain temperature may at least be a temperature at which the fused build material particles 206 melt. In addition, while the fused build material particles 206 in the certain areas 222 are in a melted state, the processor 302 may execute the instructions 320 to move the recoater to spread additional build material particles 206 onto the first layer 220 of build material particles 206 and form a second layer 220 of build material particles 206 on top of the first layer 220. The amount of energy at which the energy source 332 supplies energy during block 508 may be the same as or may differ from the amount energy at which the energy source 332 supplies energy during block 506. Additionally, as discussed herein, a separate energy source, e.g., a melting device 334, may be implemented at block 506 than at block 508.

With reference now to FIG. 6, at block 602, the processor 302 may execute the instructions 312 to move a recoater 330 to form a first layer 220 of build material particles 206. The recoater 330 may be implemented to form the first layer 220 of build material particles 206 as discussed above with respect to FIGS. 1A and 2.

At block 604, the processor 302 may execute the instructions 316 to selectively fuse build material particles 206 in the first layer 220 by applying fusing energy onto the build material particles 206 in a certain area 222. For instance, the processor 302 may control a melting device 334 to apply focused energy onto the build material particles 206 in the certain area 222, in which the focused energy is to melt the build material particles 206. The focused energy may be a laser beam and the melting device 234 may be a laser beam source. By way of example, the processor 302 may control the melting device 234 to heat the build material particles 206 in the certain area 222 with sufficient energy to cause the build material particles 206 upon which the focused energy is applied to melt. As application of the focused energy is ceased, the melted build material particles 206 may begin to cool and fuse together.

At block 606, the processor 302 may execute the instructions 318 to scan an energy source 332 across the first layer 220 of build material particles 206 while the energy source 332 raises or maintains the fused build material particles 206 in locations 222 of the first layer 220 that receive energy from the energy source 332 above a certain temperature. That is, the energy source 332 may apply energy, e.g., temperature, radiation, light, etc., onto strips of the first layer 220 of build material particles 206 as the energy source 332 is scanned, e.g., progressively along strips of the first layer 220. The energy source 332 may broadly apply energy across the strips or may apply energy selectively across the strips as discussed herein. The certain temperature may at be least a temperature at which the fused build material particles 206 melt. In addition, while the fused build material particles 206 in the certain areas 222 are in a melted state, the processor 302 may execute the instructions 320 to move the recoater to spread additional build material particles 206 onto the first layer 220 of build material particles 206 and form a second layer 220 of build material particles 206 on top of the first layer 220.

Although not shown in FIGS. 4-6, the processor 302 may execute the instructions 322 to move the print bed 336 and the operations listed in the methods 400-600 may respectively be repeated. These processes may be repeated until a 3D part is fabricated.

Some or all of the operations set forth in the methods 400-600 may be contained as utilities, programs, or subprograms, in any desired computer accessible medium. In addition, the methods 400-600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    a recoater;
    an energy source;
    a carriage supporting the energy source;
    a melting device;
    an agent delivery device; and
    a processor configured to:
        control the carriage to move the energy source across a top layer containing build material particles;
        control the energy source to apply energy of sufficient strength to heat fused build material particles in the top layer to at least a melting temperature of the fused build material particles without causing unfused build material particles in the top layer to melt and fuse together; and
        control the recoater to follow the energy source to spread additional unfused build material particles in a new top layer on top of the heated top layer while portions of the top layer containing the fused build material particles are maintained at at least the melting temperature of the fused build material particles;
        control the agent delivery device to selectively deposit a fusing agent onto the additional unfused build material particles at portions of the additional unfused build material particles to be fused; and
        control the melting device to apply energy to selectively melt the portions of the additional unfused build material particles in the new top layer upon which the fusing agent was selectively deposited, wherein the melted portions of the additional unfused build material particles in the new top layer become fused after being cooled.

2. The apparatus according to claim 1, wherein the processor is configured to control the recoater to move in a first direction during spreading of the additional unfused build material particles and wherein the energy source is positioned ahead of the recoater along the first direction.

3. The apparatus according to claim 2, wherein the processor is configured to control the recoater to be moved away from the top layer containing the build material particles and the new top layer containing the additional unfused build material particles and returned to a start position of the recoater.

4. The apparatus according to claim 1, wherein the carriage supports the recoater.

5. The apparatus according to claim 1, wherein the processor is further configured to control the carriage with the energy source to move concurrently with movement of the recoater.

6. The apparatus according to claim 1, wherein the recoater is rotatable to spread the additional unfused build material particles.

\* \* \* \* \*